United States Patent [19]

Koegel

[11] 4,170,149

[45] Oct. 9, 1979

[54] MULTI-SPEED TRANSMISSION WITH IMPROVED SHIFTING MEANS

[75] Inventor: Ralph A. Koegel, Brookfield, Wis.

[73] Assignee: Bunker Ramo Corporation, Oak Brook, Ill.

[21] Appl. No.: 826,850

[22] Filed: Aug. 22, 1977

[51] Int. Cl.$^2$ .................... F16H 3/38; G05G 1/00
[52] U.S. Cl. .................................. 74/339; 74/470
[58] Field of Search ............... 74/339, 470, 475, 532

[56] References Cited

U.S. PATENT DOCUMENTS

| | | | |
|---|---|---|---|
| 521,252 | 6/1894 | Anderson | 74/533 |
| 827,742 | 8/1906 | Markgraf | 74/470 X |
| 1,110,249 | 9/1914 | Bailey | 74/339 X |
| 2,019,073 | 10/1935 | Cooper et al. | 74/339 X |
| 2,757,549 | 8/1956 | Dale | 74/470 |
| 2,881,993 | 4/1959 | Browne | 74/470 X |
| 2,909,940 | 10/1959 | Dawkins | 74/470 X |
| 3,135,129 | 6/1964 | Merritt | 74/470 |
| 3,878,926 | 4/1975 | Adachi | 74/470 |
| 3,998,109 | 12/1976 | O'Brien | 74/475 |

FOREIGN PATENT DOCUMENTS

| | | | |
|---|---|---|---|
| 654341 | 4/1929 | France | 74/470 |
| 94131 | 1/1939 | Sweden | 74/470 |

*Primary Examiner*—Lance W. Chandler
*Attorney, Agent, or Firm*—Hill, Van Santen, Steadman, Chiara & Simpson

[57] ABSTRACT

A manually operable, self engaging shifting lever construction which is integrally incorporated into a multi-speed transmission. The lever construction itself incorporates a stiff tension spring member which is radially deflectable from its normally straight position relative to the axis thereof. Pivotally moving the lever construction about its fulcrum produces sliding movement of an input gear cluster along an input shaft means. At predetermined locations along the input shaft longitudinally, the gear cluster becomes engageable with drive gear assemblies of an output, a drive gear cluster which is mounted on an output shaft. The flexural characteristics of the lever construction permit simple, safe shifting of the input gear cluster, without the impass normally encountered due to abutment of gear teeth.

24 Claims, 10 Drawing Figures

MULTI-SPEED TRANSMISSION WITH IMPROVED SHIFTING MEANS

BACKGROUND OF THE INVENTION

In certain multi-speed transmissions, particularly those of the type wherein gear shifting is achieved through the use of an axially slidable input gear means on an input shaft to engage individual output gear means associated with an adjacent output shaft for achieving variations in rotational speed of the output shaft relative to the input shaft, it has heretofore been conventional to provide a rigid gear shifting lever which is so functionally associated with the slidable input gear means that pivotal movements of the terminal portion of the lever's arm axially moves the slidable gear means relative to the output gear means for achieving a desired gear shifting and engagement.

With such a prior art rigid shifting lever, it is necessary to have clamping means for fixing such lever in a predetermined location once a desired gear shift and engagement has been achieved, suitable such clamping means commonly involving bolts, pins or other common detent means some of which characteristically require an appreciable amount of time for operation both before and after a shifting operation from one shift location to another thereof has been carried out.

Also, with such a rigid shifting lever, in shifting, an operator frequently found it necessary to jog a stopped machine in order to bring the transmission input gear means into actual engagement with the output gear means so as to achieve a desired machine operating speed. The necessity to jog a machine can be a relatively dangerous undertaking since in jogging while shifting an operator can be dangerously close to moving machine components. Also, in many industrial environments, a given machine is subject to being operated by more than one person at any given time. Therefore, an operator who is in the process of shifting gears on a transmission requiring jogging for gear engagement is in danger of being injured.

There is, therefore, a need in the transmission art for a mechanism which will enable an operator to shift gears in a multi-speed transmission without the need for time consuming auxiliary operations and without the need for jogging to achieve a desired gear engagement.

BRIEF SUMMARY OF THE INVENTION

The present invention avoids the above indicated disadvantages of the prior art and provides new and improved assembly of multi-speed transmission and new shifting lever mechanism therefor. The present improved shifting lever mechanism incorporates a coiled stiff tension spring in a mid section of the lever arm assembly thereof. This spring is adapted for radial deflecting movements relative to the normal axis of the arm in response to laterally exerted pressures exerted on one or the other of the opposed end regions of such arm assmebly.

An object of this invention is to provide a combination of multi-speed transmission and gear shifting lever assembly which is operable to achieve gear shifting rapidly and simply, and safely without time consuming preliminary, or post shifting, auxiliary operations.

Another object is to provide, in a multi-speed transmission assembly, a gear shifting lever assembly which can be operated to effectively shift gears in the transmission from one gear combination to another thereof without the necessity to jog the input shaft of the transmission assembly.

Another object is to provide a shifting lever assembly for a multi-speed transmission which will automatically tend to engage predetermined input gear means with output gear means after a shifting operaton without any need for transmission input shaft jogging.

Another object is to provide such a self actuating shifting lever assembly which can be associated with and incorporated into an existing multi-speed transmission with a minimum of transmission modification.

Another object of this invention is to provide a shifting lever assembly for a multi-speed transmission which will improve transmission operating characteristics and increase operating safety.

Another object is to provide for a multi-speed transmission a lever assembly which is characterized by requiring a substantial percentage of the total maximum force transversely applied thereto produce not more than a minor deflection thereof with the remainder of such total maximum force being used to accomplish substantially all of the deflectivity thereof.

Other and further objects, purposes, advantages, aims, utilities, features and the like will be apparent to those skilled in the art from a reading of the present specification taken together with the drawings.

DETAILED DESCRIPTION

Figure 1:
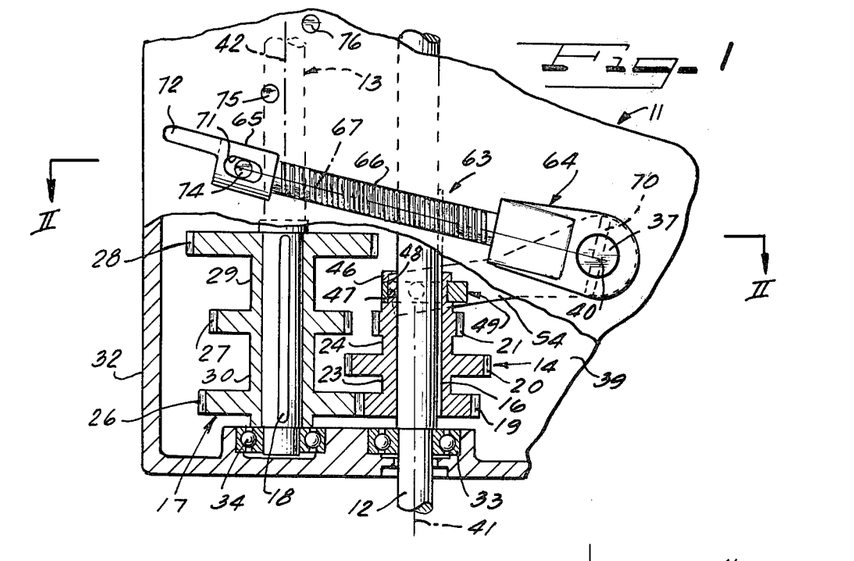
FIG. 1 is a side elevational view of one embodiment of a multi-speed transmission of this invention equipped with a new shifting lever assembly as taught by the present invention, some parts thereof broken away and some parts thereof being shown in section.
Figure 2:
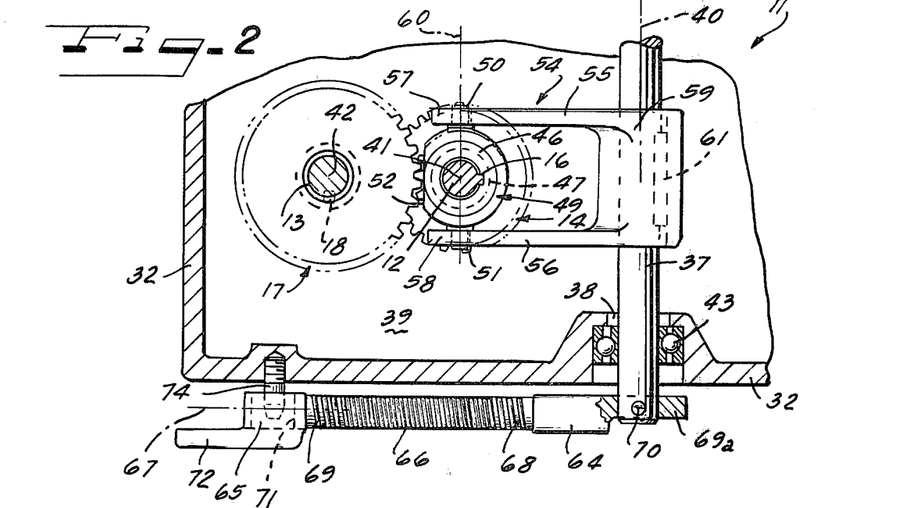
FIG. 2 is a vertical sectional view taken generally along the line II—II of FIG. 1.
Figure 3:
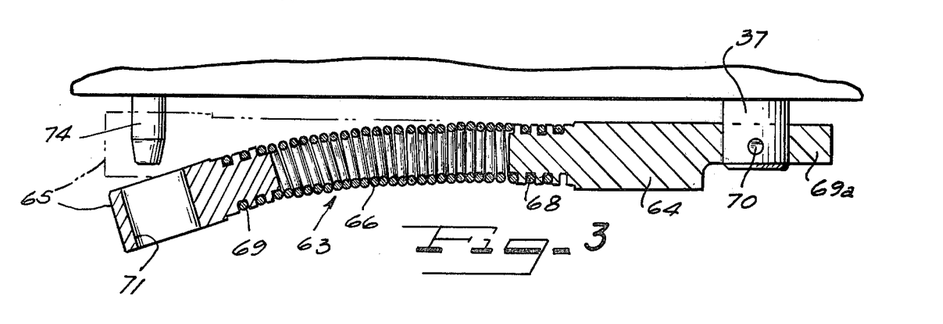
FIG. 3 is an enlarged fragmentary detail view taken in longitudinal section through the lever assembly as shown in FIG. 2.

Referring to FIGS. 1 through 3, there is seen a multi-speed transmission 11 which has a power input shaft 12 and a power output shaft 13, the shafts 12 and 13 having axes disposed in spaced parallel relationship to one another. Shaft 12 is axially associated with a first gear cluster 14 which is keyed to shaft 12 by a longitudinally extending key 16 between the input shaft 12 and the gear cluster 14. The gear cluster 14 is adapted for reciprocal sliding movements longitudinally (axially) along a predetermined portion of the input shaft 12. A second gear cluster 17 is axially disposed on output shaft 13 and is keyed fixedly thereto by key 18 which longitudinally extends along output shaft 13 between the output shaft 13 and second gear cluster 17.

First gear cluster 14 includes three axially spaced gears 19, 20, and 21 which are spaced from one another by integral sleeves 23 and 24, respectively. The gears 19 and 21 at opposite longitudinal ends of gear cluster 14 each have a different diameter from the other thereof and each has a diameter which is smaller than the diameter of the middle gear 20. Correspondingly, second gear cluster 17 also has three axially spaced gears 26, 27 and 28 which are longitudinally spaced from one another along the axis of output shaft 13 by means of integral spacer sleeves 29 and 30, respectively. The gears 26 and 28 at opposite ends of second gear cluster 17 each have a different diameter from the other thereof and also have respective diameters which are each greater than the diameter of the middle gear 27. The interrelationship between first gear cluster 14 and second gear cluster 17 is such that each of the respective end gears 19 and 21 of first gear cluster 14 is engagable with a different one (here gears 26 and 28, respectively) of the end gears of the second gear cluster 17, and the middle gear 20 of first gear cluster 14 is engagable with the middle gear 27 of the second gear cluster 17. The engagement of any one gear 19, 20 or 21 of first gear cluster 14 with a mating gear, respectively 26, 27, or 28 of second gear cluster 17 being dependent upon the position of first gear cluster 14 axially along the power input shaft 12.

When a gear 19, 20, or 21 is thus engaged with a gear 26, 27 or 28, output shaft 13 revolves, the number of revolutions per unit of time of output shaft 13 thus bearing a fixed relationship to the number of revolutions per unit of time of input shaft 12, the exact value being dependent upon which gear pair of pairs 19/26, 20/27, or 21/28 is engaged one with the other in any given instance. As those skilled in the art will appreciate, transmission 11 is generally adapted to accomplish a speed reduction so that the output shaft 13 is adapted to turn, characteristically, at a lower (smaller) number of revolutions per unit of time than is characteristically associated, correspondingly, with input shaft 12, the transmission 11 being particularly well adapted for use in a situation where input shaft 12 is driven by a powerhead (not shown) such as an electric motor whose drive shaft revolves at a relatively high number of revolutions per minute and where the output shaft 13 is being used to power or drive a machine, such as a take up mechanism on a circular knitting machine or the like (not shown) which operates at a reduced rpm relative to the motor rpm.

In transmission 11, the respective gear clusters 14 and 17 are contained within a housing 32 which is adapted for supporting the input shaft 12 and the output shaft 13, the shafts 12 and 13 being journalled for rotational movements relative to housing 32 by means of bearing assemblies such as bearing assemblies 33 and 34, respectively.

To permit an operator to shift transmission 11, a lever assembly herein designated in its entirety by the numeral 63 is provided. Lever assembly 63 incorporates a fulcrum shaft 37 which extends through a wall of housing 32 through an appropriately formed aperture 38 therein so that the fulcrum shaft 37 is spatially located mainly within the chamber 39 defined by housing 32 so that the axis 40 of shaft 37 is perpendicular to the axis 41 of shaft 12 (and also the axis 42 of shaft 13). To provide shaft 37 with the capability of pivotal movements about axis 40, a bearing assembly 43 is provided for journalling the shaft 37 relative to housing 32.

Located in a circumferentially extending channel 47 formed in a collar 46 located longitudinally between gear 21 and the adjacent end 48 of first gear cluster 14 a yoke 49 is positioned. Bearing surfaces (not detailed) are provided in the adjacent regions between yoke 49 and channel 47 of collar 46 so that yoke 49 is adapted to remain spatially substantially stationary during rotational movements of input shaft 12 and first gear cluster 14.

Yoke 49 is provided with a pair of diametrically opposed (relative to shaft 12) generally coaxial (with respect to one another) pivot pins 50 and 51. The circumferential side portion 52 of yoke 49 is bevelled to avoid interference between yoke 49 and second gear cluster 17.

A fork 54 is provided which has a pair of tines 55 and 56. Tines 55 and 56 have terminal regions 57 and 58, respectively, apertured and adapted to receive thereinto respective ones of pivot pins 50 and 51, the fork 54 thus being adapted for pivotal movements relative to the yoke 49.

tines 55 and 56 are integrally interconnected with fork base 59. Shaft 37 extends through an appropriate aperture formed in base 59 so that the axis 40 of shaft 37 is in spaced parallel relationship to the common axis of pivot pins 50 and 51. A key 61 longitudinally extending along the shaft 37 keyes the fork 54 to the shaft 37.

The lever arm assembly 63 is provided with a fulcrum portion 64, a terminal portion 65, and an elongated central portion 66. Central portion 66 is here comprised of a coiled stiff tension spring having a normally straight axis 67. As more fully hereinafter explained, this spring is here preferably constructed of a pretensioned coil spring which requires a predeterminable, substantial force to be laterally applied thereto before sidewise deflection commences, and which, once so deflected, strongly yieldingly urges itself back into a normally straight configuration. One end region 68 thereof is adapted to be threadably engaged with a mating prethreaded region of fulcrum portion 64, and similarly, the opposite end region 69 thereof is threadably engaged with terminal portion 65. The terminal portion 65 and the fulcrum portion 64 are conveniently formed of metal by machining from stock.

A forward ear 69A integral with fulcrum portion 64 is mounted through an appropriately formed aperture therethrough over the exposed end of shaft 37 with the fulcrum portion 64 being retained in a fixed position relative to the fulcrum shaft 37 by means of a pin 70 extending through ear 69A and shaft 37. Any convenient means may be employed to secure the fulcrum portion 64 to the shaft 37. The terminal portion 65 has centrally formed therein an axially elongated channel 71. Integral with the terminal portion 65 is a finger 72 serving as an auxiliary arm member adapted to provide a finger engaging projection on lever arm assembly 63 to facilitate operational use of assembly 63. Lever arm assembly 63 is thus located exteriorly of housing 32.

When lever arm assembly 63 is pivoted about axis 40 of shaft 37, the first gear cluster 14 is shifted along axis 41 of input shaft 12 thereby permitting gear shifting between first gear cluster 14 and second gear cluster 17. A plurality of detents, here pins (or posts) 74, 75, and 76 are mounted in housing 32 at locations along the arcuate path of channel 71 as the arm assembly 63 pivots about axis 40. Each post can be threadably received, for example, into a mating threaded socket formed in the housing 32.

When, for example, gear 19 is engaged with gear 26, the location of arm assembly 63 is such that, with the axis 67 being straight, post 74 is seated in channel 71. When it is desired to engage gear 20 with gear 27, for example, terminal portion 65 is disengaged from such post 74 conveniently through lifting action exerted on finger 72 so as to deflect the central portion 66 into a configuration such as is illustrated for example in FIG. 3. With terminal portion 65 thus moved out of engagement with post 74, the lever arm assembly is moved about axis 40 until the channel 71 overlies post 75, the location of post 75 being so chosen that the desired engagement of gear 20 with gear 27 is obtained when the axis 67 of arm assembly 63 is straight. In the same manner other gear shifting operations are carried out such as a shift of the transmission 11 so that gear 21 is engaged with gear 28 with the pin 76 resting in the channel 71. In a transmission of this type, the power can be introduced on shaft 13 rather than shaft 12, as those skilled in the art will appreciate. In such a case, shaft 13 becomes the input shaft and shaft 12 the output shaft. The flectural characteristics of the lever construction permit simple, safe shifting of the input gear cluster by sustaining forces great enough to slide the gear cluster or to maintain it in a selected position without appreciable deflection. When abnormal resistance is encountered however, such as by abutment of gear teeth, the lever will flex to facilitate movement of the lever to the desired position. Subsequently when the abutting gear teeth become alligned, the flexed lever will cause the gear cluster to slide to the corresponding selected position.

Figure 4:
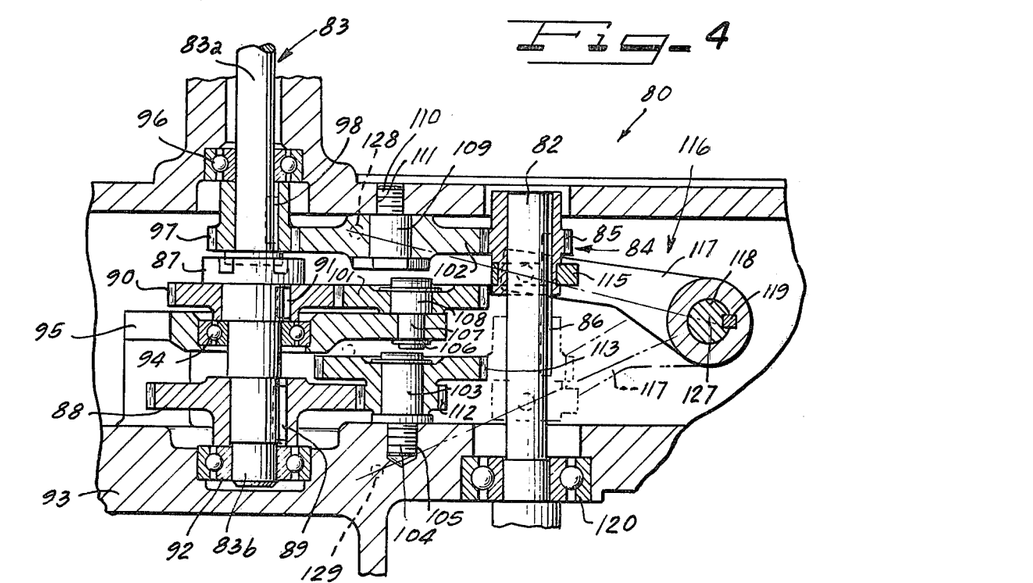
FIG. 4 is a transverse sectional view through another embodiment of a multi-speed transmission of this invention equipped with another embodiment of a new shifting lever assembly as taught by the present invention.
Figure 5:
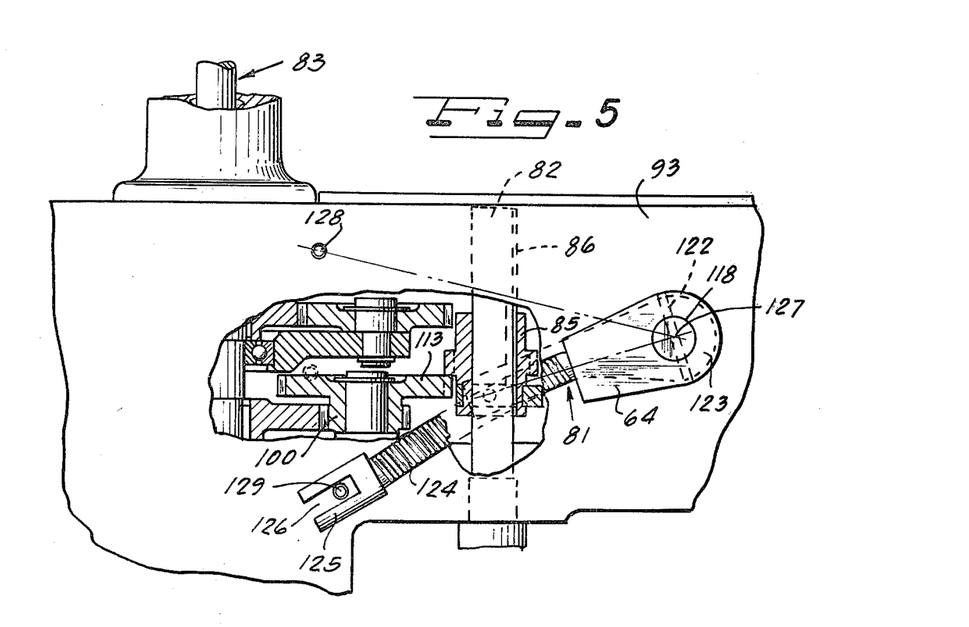
FIG. 5 is a side elevational view of the embodiment shown in FIG. 4, some parts thereof broken away and some parts thereof shown in section.

Referring to FIGS. 4 and 5 there is seen another embodiment of a transmission herein designated in its entirety by the numeral 80 with which an embodiment of a lever arm assembly of this invention, which embodiment is designated in its entirety by the numeral 81, is functionally associated. Transmission 80 incorporates a power input shaft 82 located in axially spaced parallel relationship to a power output shaft means 83. A first gear cluster or assembly arrangement 84 is positioned about input shaft 82 and an elongated key 86 is provided which extends longitudinally along the shaft 82 for keying the first gear cluster 84 to shaft 82. Gear cluster 84 is thus adapted for reciprocal sliding movements longitudinally along a predetermined portion of the shaft 82. The first gear cluster 84 utilizes only a single power transfer gear 85.

The output shaft 83 is itself comprised of two coaxial, abutting portions 83A and 83B with an inter-engaging conventional coupling connection 87 therebetween. The shaft portions 83A and 83B are utilized in order to permit a simple assembly and disassembly of a transmission 80.

A drive gear 88 is mounted on shaft 83B and keyed thereto by means of key 89. In spaced relationship thereto a drive gear 90 is mounted also on shaft 83B (this one adjacent the coupling connection 87) and is keyed thereto by means of key 91. Shaft 83B is journalled for rotational movements by a bearing assembly 92 positioned in the wall of a housing 93 of transmission 80 and also by a bearing assembly 94 supported by a carrier projection 95 integrally formed with housing 93. Shaft 83A is similarly journalled for rotational movements relative to housing 93 by means of a bearing assembly 96. Between the coupling connection 87 and the bearing assembly 95 another drive gear 97 is mounted on shaft 83A and keyed thereto by means of key 98. Drive gear 88 has the largest diameter and drive gear 97 the smallest diameter with the diameter of drive gear 90 being intermediate therebetween.

To effectively interengage power transfer gear 95 individually with each of the drive gears 88, 90 and 97, reach gears 100, 101, and 102, respectively are employed. Reach gear 100 is journalled on stub shaft 103 whose base 104 is threadably received in a mating socket formed in housing 93. Reach gear 101 is journalled on stub shaft 108 which is secured by means of snap ring 106 through an aperture 107 formed in projection 95. Reach gear 102 is journalled on stub shaft 109 whose threaded base 110 is threadably received in mating socket 111 is housing 93.

The location and diameter of reach gear 102 is such that reach gear 102 permanently engages mating teeth in drive gear 97 and is also engagable with transfer gear 85, depending upon the axial location of transfer gear 85 on shaft 82. Similarly, reach gear 101 is simultaneously engagable with drive gear 90 and transfer gear 85. To similarly engage reach gear 100 simultaneously with drive gear 88 and transfer gear 85, reach gear 100 is provided with two sets of gear teeth one set being designated by the numeral 112 the other set by the numeral 113. The diameter of set 112 is much shorter than that of set 113, and set 112 is directly engagable with the teeth of drive gear 88 while the set 113 teeth are directly engagable with the transfer gear 85 (when such has been moved axially along the shaft 82 into an engagable position therewith).

Transmission 80 is adapted for achieving an rpm reduction between the initial or starting speed of rotation of input shaft 82 and the final rpm rotational speed of output shaft 83. The least reduction in shaft rpm is achieved by the combination of reach gear 102 with drive gear 97 while the greatest change in rpm is provided by the combination of reach gear 100 with drive gear 88. An intermediate change in shaft speeds is provided by the combination of reach gear 101 with drive gear 90, all as those skilled in the art will readily appreciate. In the operative position illustrated for transmission 80 in FIG. 4, transfer gear 85 is engaged with reach gear 102. In order to achieve a gear shift in transmission 80, a lever assembly means is employed which is herein designated in its entirety by the numeral 116. Lever assembly means 116 employs a yoke 115 similar to yoke 49 and a fork 117 similar to fork 54. The fork 117 being keyed to a fulcrum shaft 118 by a key 119, the fulcrum shaft 118 and key 119 being similar to fulcrum shaft 37 and key 61, respectively. Shaft 82 is journalled for rotational movements relative to housing 93 by means of bearing assembly 120.

Exteriorly of housing 93, lever arm assembly 81 is pinned by pin 122 to the end of fulcrum shaft 118, the pin 122 extending through a fulcrum portion 123, fulcrum portion 123 being constructed similarly to fulcrum portion 64.

Lever arm assembly 81 also includes a central portion 124 which is similar to central portion 66 and a terminal portion 125 which is similar in construction to terminal portion 65 except that here terminal portion 125 has an axially rearwardly opening slot 126 defined therein in place of the channel 71. Also, terminal portion 125 does not have associated with it a finger such as finger 72 so as to limit ease of operating the lever arm assembly for safety reasons, as those skilled in the art will appreciate.

When slot 126 is engaged with post 128 (which is analogous to post 74) transfer gear 85 is interconnected with the reach gear 102 as shown in FIG. 4. In FIG. 5, however, the terminal portion 125 has been lifted away from the adjoining adjacent face of the housing 93 and the lever arm assembly 81 has been pivoted about the axis 127 of shaft 118 to a location where by flexing of the central portion 124 from its normally straight configuration the slot 126 is engaged with pin or post 129 (which is analogous to post 74). However, when terminal portion 125 is engaged with post 129 the transfer gear 85 is not engagable with the reach gear 100.

The transfer gear 85 is not engagable with the teeth set 113 of reach gear 100 owing to a slight misalignment of teeth. The yielding bias afforded by the flexure of the central portion 124 of, the lever arm assembly 81 in a configuration shown in FIG. 5 against the transfer gear 85 causes transfer gear 85 to be maintained in an adjacent lateral contacting relationship with the set of gear teeth 113. As soon as adequate relative movement occurs between the teeth set 113 and the transfer gear 85, the transfer gear 85 comes into meshing engagement with the set of gear teeth 113 of the reach gear 100 and the central portion 124 of lever arm assembly 81 again assumes a straight configuration between the fulcrum portion 123 and the terminal portion 125 thereof. In this way, the lever arm assembly 81 avoids any necessity to achieve a jogging of transmission 80 during a manual gear shifting thereof, in accordance with a preferred and most desirable advantage associated with the present invention.

Figure 6:
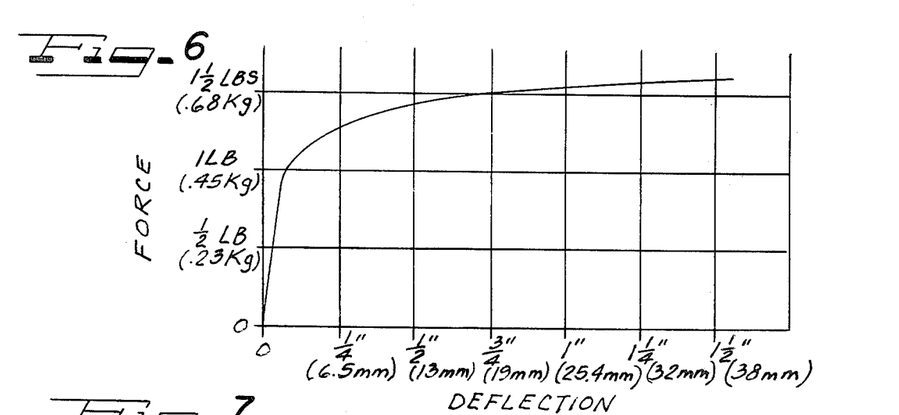
FIG. 6 is a graph illustrating the relationship between deflection, as abscissae, and force, as ordinates, for one embodiment of a tension spring member incorporated, for example, into a lever assembly of the type illustrated in FIGS. 4 and 5.

The type of flexural characteristics associated with a spring member used in a lever arm assembly of a multispeed transmission as provided by the present invention are further illustrated by the plot of FIG. 6 which shows the deflection force interrelationship for one embodiment of this invention as illustrated by this plot, in general, not more than the first approximately 4% of the total spring deflection results in a build up of at least about ⅔ of the total maximum applied force use for deflection on each of a preferred class of spring members utilized in the practice of this invention. Furthermore, for the members of such class, thereafter the entire terminal remaining approximately 96% of deflection is achieved by only not more than about a ⅓ increase of the total such maximum applied force. The spring member is in an initially straight configuration when in its relaxed state. Deflection is the displacement laterally from one detent to another in a given multispeed transmission. Thus, in any given situation or application the spring member chosen as such is characteristic, as just indicated.

Figure 7:
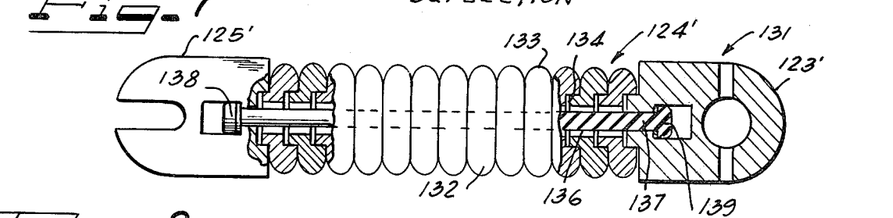
FIG. 7 is a side elevational view of an alternative embodiment of a lever assembly adapted for use in combination with a multi-speed transmission of the type shown for example in FIGS. 4 and 5 with some parts thereof being shown in longitudinal section.

Referring to FIG. 7, there is seen an alternative lever assembly means adapted for use in this invention which is herein designated in its entirety by the numeral 131. Lever assembly 131 may be used in place of the lever assembly 116, for example. In assembly 131 components similar to, or analogous to the components of lever assembly 116 are similarly numbered but with the addition of prime marks thereto, for convenience and brevity. The central portion 124' of lever assembly 131 is seen to be comprised of a plurality of axially adjacent, inter-nesting cup members 132 each of which is characterized by having longitudinally rounded peripheral (circumferential) surface portions 133. On one side of each cup member 132 a cup-shaped depression 134 is formed while on the opposing shape thereof a projection 135 is formed which is adapted to nestingly extend into the depression of an axially adjacent cup member 132. The depressions 134 and projections 135 are symmetrically placed about the axis of each cup member 132. An aperture 136 is axially formed in each cup member 132 and when such plurality of cup members 132 are interengaged with one another in the manner shown, for example, in FIG. 7 and elastomeric rod or arm member 137 is extended threadably therethrough, the cup members 132 themselves being of relatively rigid, nonyielding construction such as molded plastic, molded metal, or the like, as desired. Opposing end portions 138 and 139, respectively, are enlarged and adapted to be received into slotted recesses formed in respective ones of fulcrum portion 123' and terminal portion 125'. The interrelationship between the cup members 132 and the rod member 137 is such that when the terminal portion 125 is deflected transversely relative to the axis of the assembly 131 with the fulcrum portion 123 being maintained in an initially fixed position, the central portion 124 experiences a relationship between force and deflection comparable to that illustrated in FIG. 6 above.

Figure 8:
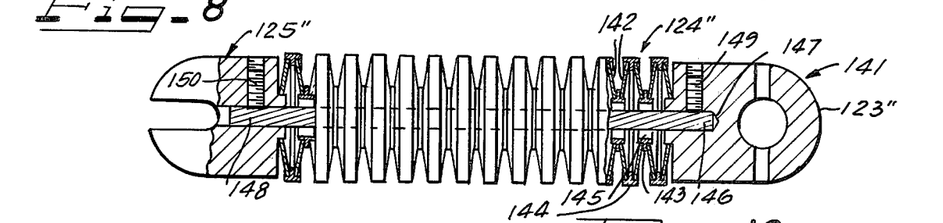
FIG. 8 is a view similar to FIG. 7 but showing a further alternative embodiment of such a lever assembly.

Referring to FIG. 8, there is seen a further embodiment of a lever assembly herein designated in its entirety by the numeral 141 which may be, like lever assembly 131, used in place of the lever assembly 116. Lever assembly 141 has portions thereof comparable to the lever assembly 116 and the same are accordingly similarly numbered for convenience but with the addition of double prime marks thereto. The central portion 124" of lever assembly 141 incorporates a plurality of axially adjacent Belleville dished disks 142 stacked in series. The individual disks 142 are maintained in the illustrated desired interrelationship with one another by means of a plurality of inner cross-sectionally t-shaped ring members 143 which are interdigitated with a plurality of outer cross-sectionally t-shaped ring members 144. The inner ring member 143 have a smaller internal diameter than the outer ring members 144 and the inner ring member 143 define an axially extending channel through the resulting assembly of disks 142 and ring members 143 and 144. The ring members 143 and 144 can be of relatively rigid construction while the disks 142 have circumferential flexural characteristics. Disk 142 and ring members 143 and 144 can be comprised of metal, plastic, or the like. Through the axial channel 145 defined by inner ring members 143 and associated disks 142 and ring members 144 extends a cable 146 which is flexible transversely but is longitudinally substantially inelastic. The cable 146 at its opposite end portions 147 and 148 is clamped into respective ones of the fulcrum portion 123" and terminal portion 125" by means of set screws 149 and 150, respectively. When the terminal portion 125" is flexed analogously to terminal portion 125' flexural characteristics in relation to deflection responsively to applied force is chosen so as to be comparable to the interrelationship shown in FIG. 6.

Figures 9, 10:
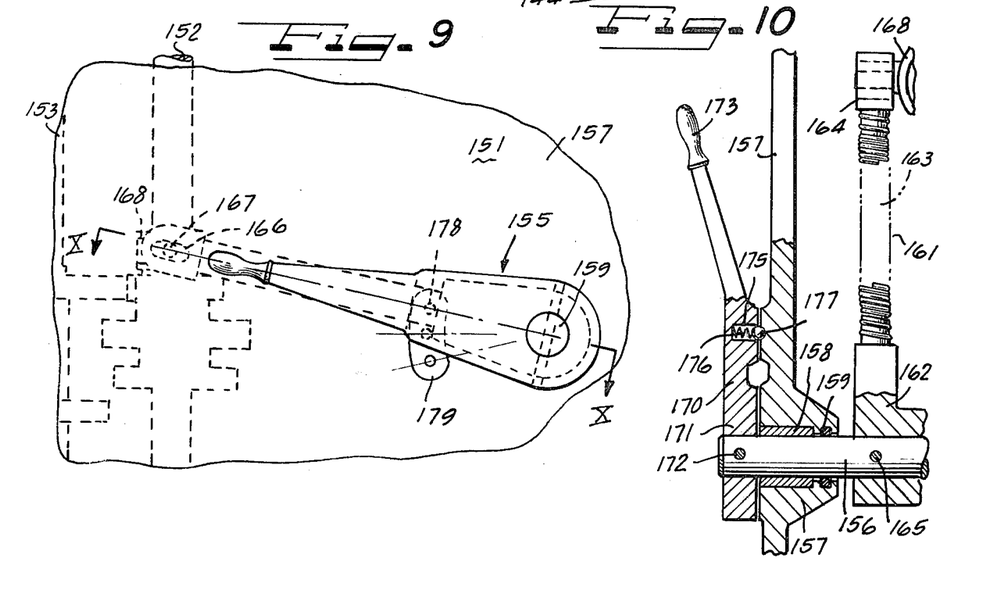
FIG. 9 is a side elevational view of a further embodiment of a portion of a multi-speed transmission of this invention equipped with a still further embodiment of a new lever assembly as taught by the present invention.
FIG. 10 is a fragmentary transverse sectional view through the hub portion of the lever assembly of the embodiment of FIG. 9.

Referring to FIGS. 9 and 10, there is seen a multi-speed transmission 151 which has a power input shaft 152 and a power output shaft 153 (shown in phantom lines). Transmission 151 in construction may be regarded as being similar to the transmission 11 earlier described, but, as those skilled in the art will appreciate, a transmission similar to transmission 80 in construction could be alternatively employed, or otherwise, as desired, so far as the practice of the present invention is concerned.

To permit an operator to shift transmission 151, a lever assembly herein designated in its entirety by the numeral 155 is provided. Lever assembly 155 incorporates a fulcrum shaft 156 which extends through a wall of housing 157 through an appropriately mounted bearing 158 mounted in housing 157. An O-ring 159 provides sealing engagement between shaft 156 and housing 157. The axis of shaft 156 is generally perpendicular to the axis of shaft 152 (and also the axis of shaft 153).

An arm assembly 161 is employed in lever assembly 155, the arm assembly 161 being provided with a fulcrum portion 162, the terminal portion 164 and an elongated central portion 163. The fulcrum portion 162 is mounted about the shaft 156 and is fixed thereto by means of pin 165.

The central portion 163 is comprised of a coiled stiff tension spring having a normally straight axis; central portion 163 corresponds to central portion 66 of lever arm assembly 63, fulcrum portion 162 corresponds to fulcrum portion 64, and terminal portion 164 corresponds to terminal portion 65. Terminal portion 164 contains therein an axially extending slot 166 through which extends a pin 167 which is adapted for longitudinal sliding movements (relative to the axis of arm assembly 161) in slot 166. The pin 167 radially outwardly extends from shaft 152 but is rigidly associated with a yoke assembly 168. Thus, pivotal movements of the shaft 156 causes shifting of the gears in the multi-speed transmission 151 analogously to the manner in which gears are shifted in the transmission 11.

Pivotal movements of the shaft 156 are achieved by means of a lever arm 170 whose fulcrum 171 is extended about the terminal portion of shaft 156 projecting outside of the housing 157, the fulcrum portion 171 being fixed to the shaft 156 by means of a pin 172. Conveniently, the lever arm 170 is provided with a terminal handle region 173 for convenience of an operator. Along a mid region of the lever arm 170 is located a channel 175 which is axially in spaced relationship to the axis of the shaft 156 but the channel 175 does not extend through the arm 170 but only inwardly therefrom in adjacent relationship to housing 157. A spring of the coiled compression type yieldingly urges a ball 177 outwardly from the end of channel 175. The ball 177 is adapted to be matingly received into indended regions 178 formed in the outside face of housing 157 in spaced relationship to one another but in an aligned relationship to the path taken by the ball 177 during arcuate movements of the lever arm 70 in response to forces applied for arcuate reciprocal movements to handle region 173. Conveniently, the depressions 178 are formed in a raised, integral platform 179 formed on the outside face of housing 157. Thus, movement of the handle region 157 effectuates shifting of multi-speed transmission 151 in the same manner as is accomplished, for example, by means of the lever assembly 63 and transmission 11 but in the transmission 151 the arm assembly 161 is entirely contained within the housing 157.

Although the teachings of my invention have herein been discussed with reference to specific theories and embodiments, it is to be understood that these are by way of illustration only and that others may wish to utilize my invention in different designs or applications.

I claim:

1. In a multi-speed transmission of the type including a supporting housing, a first power shaft means in axially spaced parallel relationship to a second power shaft means, a first gear means functionally associated with said first shaft means and a second gear means functionally associated with said second shaft means, said first gear means being axially reciprocally slidable along said first shaft means, said second gear means including a plurality of longitudinally spaced drive gear means, each one of which is individually gear engagable with said first gear means, the improvement which comprises in combination:

a lever arm assembly incorporating an elongated central portion thereof, said central portion comprising a flexible means having a normally straight axis and being adapted for transverse flexural movements relative to said axis, in said central portion, said flexible means requiring a predeterminable, substantial initial force to be laterally applied thereto before appreciable sidewise deflection thereof occurs, and which said flexible means, when once so initially deflected require only a minor additional force for achieving a further deflection thereof, first connecting means extending between, and functionally interconnecting, said first gear means and one end of said arm assembly whereby pivotal movements of said arm assembly slidably moves said first gear means axially along said first shaft for shifting of said transmission and said gears thereof, a plurality of detent means associated with said housing and arranged in spaced relationship to one another along a path corresponding to a portion of a hypothetical circle having its center on the pivot axis of said arm, the location of each one of said detent means corresponding to a different predetermined gear engaging position between said first gear means and said second gear means, second connecting means extending between and functionally detachably interconnecting said arm assembly and said detent means for selectively positioning said arm assembly relative to individual selected ones of said detent means whereby the interrelationship between said gear means and said lever arm assembly is such that when the teeth of said first and second gear means do not mesh, said arm assembly will flex sufficiently to allow such selection, and, at any time after such selection when alignment of said teeth occurs, said arm assembly will straighten and maintain itself substantially straight to achieve a desired gear engagement.

2. The transmission of claim 1 wherein each of said detents comprises stud means outwardly projecting from said housing and said second connecting means comprises a slot defined in one end of said arm assembly said one end being opposed to the end connected to said first gear means.

3. The transmission of claim 2 wherein said arm assembly has functionally associated therewith an auxiliary arm member for actuating and moving said arm assembly from one to another of said stud means.

4. In a multi-speed transmission of the type including a supporting housing, a first power shaft means in axially spaced parallel relationship to a second power shaft means, a first gear means functionally associated with said first shaft means and a second gear means functionally associated with said second shaft means, said first gear means being axially reciprocally slidable movements along said first shaft means, said second gear means including a plurality of longitudinally spaced drive gear means, each one of which is individually gear engagable with said first gear means, the improvement which comprises in combination
(a) an axially pivotable fulcrum shaft in perpendicular, spaced relationship to said first shaft means,
(b) yoke means extending about a predetermined portion of said first gear means, adapted to remain stationary as said first gear means revolved,
(c) fork means having a base from which a pair of tines extends, the terminal region of each one of said tines being pivotally functionally associated across said yoke means, and said base being functionally fixed to said fulcrum shaft,
(d) a lever arm assembly comprising a fulcrum portion, a terminal portion and an elongated central portion interconnecting at its respective opposed ends said fulcrum portion and said terminal portion, and comprised of a flexural means having a normally straight arm axis and being adapted for transverse flexural movements relative to said arm axis, said fulcrum portion being interconnected with said fulcrum shaft, whereby arcuate movements slidably moves said first gear means axially along said first shaft,
(e) a plurality of detents arranged along an arcuate path corresponding to a portion of a hypothetical circle having as its center a point on said fulcrum shaft, the location of each said detent corresponding to a predetermined gear engaging position between said first gear means and said second gear means each one of said detents being engagable with said lever arm means whereby when the teeth of said first and said second gear means do not mesh said lever arm means will flex sufficiently to allow said engagement and whereby after said engagement when alignment of said teeth occurs said flexible arm assembly will straighten and maintain itself substantially straight achieving a desired gear engaging position.

5. The transmission of claim 4 wherein each of said detents is adapted to engage aperture defined in said arm assembly which rearwardly opens in a direction substantially parallel, to said fulcrum axis.

6. The transmission of claim 4 wherein said arm assembly has functionally associated therewith an auxiliary arm member adapted to provide a finger engaging means for disengaging said arm assembly from a given one of said detents.

7. The transmission of claim 4 wherein said flexible means is a pretensioned coiled tension spring.

8. In a multi-speed transmission of the type having
(A) a power input shaft means in axially spaced parallel relationship to a power output shaft means,
(B) a first gear means about one of said shaft means and including keying means between said one shaft means and said first gear means, said first gear means being adapted for axial reciprocal sliding movements along a predetermined portion of said one shaft means, and including a power transfer gear means,
(C) a second gear means about the other of said shaft means including second key means between said other shaft means and said second gear means, said second gear means including a plurality of longitudinally spaced drive gear means, each one of which is adapted to revolve said other shaft means at a different respective revolution speed in response to a hypothetical constant speed circumferentially applied individually thereto, each one of said gear means further including means enabling each one of said drive gear means to engage functionally said power transfer gear means whereby revolutionary force is transferable between said first gear means and said second gear means,
(D) housing means defining a chamber means for said shaft means and said gear means,
(E) bearing means for journalling respective ones of said shaft means relative to said housing, and
(F) lever means for axially moving said first gear means along said one shaft means for functionally selectively engaging predetermined individual ones of said drive gear means with said power transfer gear means whereby said other shaft is revolvable at respective predetermined revolution speeds relative to a given one shaft revolution speed,
the improvement which comprises in combination
(a) an axially pivotable fulcrum shaft in perpendicular spaced relationship to said input shaft means, including journal means therefor,
(b) yoke means extending circumferentially about a predetermined portion of said first gear means, including journal means adapting said first gear means for rotational movements relative to said yoke means, and further including a pair of opposed, coaxial pivot pins radially outwardly extending from said yoke means,
(c) fork means having a base from which a pair of tines extends, the terminal region of each one of said tines being pivotally functionally associated across a different one of said pivot pins, said pivot pins, said base being functionally associated with said fulcrum shaft with the axis of said fulcrum shaft being in spaced, parallel relationship to the axis of said pair of pivot pins, and including fork key means keying said fulcrum shaft to said base,
(d) a lever arm assembly comprising
(1) a terminal portion having aperture means defined therein,
(2) an elongated central portion comprised of an elongated spring means having a normally straight spring axis and being adapted for transverse flexural movements relative to said spring means requiring a predeterminable, substantial initial force to be laterally applied thereto before appreciable sidewise deflection thereof occurs, and which said spring means, when once so initially deflected require only a minor additional force for achieving a further deflection thereof,
(3) joining means interconnecting one end of said central portion to said fulcrum portion and the opposite end thereof to said terminal portion with said aperture means arranged parallel to said arm axis, (4) said fulcrum portion being interconnected with said fulcrum shaft exteriorly of said housing and including arm key means keying said fulcrum portion to said fulcrum shaft whereby arcuate movements of said terminal portion slidably moves said first gear means axially along said input shaft means, (e) a plurality of outwardly upstanding pins in said housing means, and arranged along an arcuate path corresponding to the path taken by said terminal portion during arcuate movements thereof relative to said fulcrum shaft, the location of each said pin corresponding to a predetermined gear engaging position between said first gear means and said second gear means, each one of said pins being engagable with said aperture means when said terminal portion is at said location and said arm axis is then maintainable in a normally straight configuration when a desired such gear engagement is achieved.

9. The transmission of claim 8 wherein the interrelationship between said central portion, said pins and said gear means is such that said central portion yieldingly urges said first gear means into a predetermined engagement with said second gear means when said terminal portion is engaged with a predetermined one of said pins.

10. The transmission of claim 8 wherein said aperture in said terminal portion is a slot which opens in a direction substantially opposed to said fulcrum portion of said lever arm assembly.

11. The transmission of claim 8 wherein said terminal portion has functionally associated therewith an auxiliary arm member adapted to provide a finger engaging means for disengaging said terminal portion from a given one of said pins.

12. The transmission of claim 8 wherein said first gear means includes three axially spaced power transfer gears and said second gear means includes three axially spaced drive gears, the end drive gears of said second gear means each having a different diameter from the other thereof, and also both having a diameter which is greater than the diameter of the middle one of said drive gears, and, correspondingly, the end power transfer gears of said first gear each having a different diameter from the othere thereof, and also both having a diameter which is smaller than the diameter of the middle one of said power transfer gears, each one of the respective end power transfer gears of said first gear means being engagable with a different respective one of the respective end drive gears of said second gear means, and the middle power transfer gear of said first gear means being engagable with the middle drive gear of said second gear means.

13. The transmission of claim 8 wherein said first gear means incorporates a single power transfer gear, and wherein said second gear means incorporates a plurality of drive gear means axially located about said output shaft means in axially spaced relationship to one another, each of said drive gear means having a different diameter from the others thereof, and further wherein said second gear means incorporates a plurality of reach gear means, each one of said reach gear means being journalled by a separate stub shaft means which is associated with said housing, each one of said reach gear means being adapted for continuous functional engagement with a different one of said drive gear means and being further adapted for functional engagement with said power transfer gear in dependence upon the axial location of said power transfer gear along said input shaft means.

14. The transmission of claim 8 wherein the interrelationship between said lever arm assembly and said first gear means is such that a middle one of said plurality of pins is so located as to correspond to a mid position assumed by said terminal portion along the total length of the path of arcuate movement of said terminal portion required for a complete shift pattern of said first gear means axially along said input shaft means relative to said second gear means, said mid-position corresponding to a gear engaging position between said first gear means and said second gear means.

15. The transmission of claim 8 wherein said lever means is adapted to slidably move said first gear means from a location exteriorly of said housing.

16. The transmission of claim 8 wherein said spring means is a pretensioned coiled spring.

17. The transmission of claim 1 wherein said arm assembly is located inside said housing.

18. The transmission of claim 1 wherein said arm assembly is located outside said housing.

19. The transmission of claim 1 wherein said flexible means is a pretensioned coiled spring means.

20. The transmission of claim 1 wherein said flexible means is comprised of a plurality of axially interengaging relatively rigid cup members and an elastomeric elongatable elongated strand means axially extending therethrough and maintaining said cup members in pretensioned interrelationship to one another.

21. The transmission of claim 1 wherein said flexible means comprises a Belleville spring.

22. The transmission of claim 1 wherein said flexible means is characterized by having not more than about the first 4% of total deflection result in a build-up of at least about ⅔ of the total maximum applied force used for deflection and thereafter the entire remaining deflection of approximately 96% of the total deflection is achieved by not more than about a ⅓ increase in said force.

23. The transmission of claim 1 wherein said lever arm assembly is adapted to slidably move said first gear means from a location exteriorly of said housing.

24. The transmission of claim 1 wherein said flexible means is a pre-tensioned coiled spring.

* * * * *